Jan. 1, 1957 N. F. PORATH 2,776,357

PHOTOSENSITIVE LAYER CELL

Filed April 4, 1955

*INVENTOR:-*
NORMAN F. PORATH
*BY:-*
Junius F. Cook, Jr.
ATTORNEY

United States Patent Office 2,776,357

Patented Jan. 1, 1957

2,776,357

PHOTOSENSITIVE LAYER CELL

Norman F. Porath, West Allis, Wis., assignor to General Electric Company, a corporation of New York Application April 4, 1955, Serial No. 498,875

12 Claims. (Cl. 201—63)

The present invention relates in general to electronics, and has more particular reference to photosensitive semi-conductors adapted to function for the control of associated apparatus in response to change in the intensity of incident light; the invention pertaining more especially to a photosensitive cell embodying semi-conducting material.

An important object of the present invention is to provide a photosensitive cell comprising a relatively thin film or layer of semi-conductor material; a further object being to form the layer upon a support member of material which is substantially transparent to rays to which the semi-conductor material is sensitive; a still further object being to form the photosensitive material as a layer of substantially uniform thickness, whereby the same is responsive to exciting rays substantially uniformly throughout the entire area of the layer; yet another object of the invention being to form the layer of photosensitive material upon the inner surface of a ray transparent member adapted to form a wall portion of a sealed housing, whereby the sensitive layer may be enclosed within the housing in position to receive the impingement of exciting rays penetrating the transparent member from outwardly of the housing.

Another important object is to provide a cell of the character mentioned by applying a layer of photosensitive material upon the inner surface of a hollow shell, preferably having dome-like configuration and comprising material which is substantially transparent to light rays, whereby the cell is substantially equally sensitive to exciting rays applied thereto from any direction radially thereof.

Another important object is to provide a cell of the character mentioned particularly well suited for use in conjunction with photoresponsive control apparatus, including an electrical relay operable in response to variations in the intensity of light incident upon the cell, such relay being adapted for controlling association with any operable apparatus, the operation of which may be desired in response to intensity variations of cell impinging light rays; a further object being to form the cell as a thin layer of ray responsive material coated upon the inner surface of a ray transparent member adapted to form a portion of a sealed housing enclosing the sensitive layer, together with the relay and other associated components, in dirt and moisture-proof fashion, thereby providing a convenient unit well adapted for use in position exposed to natural weather conditions, as for the control of power operated equipment, such as street and other outdoor lighting systems, in response to the variation of natural skyshine during day and nighttime periods.

Another important object is to provide a photosensitive cell of the character mentioned comprising a dome-like shell of ray transparent material having a layer of photosensitive material coated thereon, such shell being readily sealable upon a relay supporting base to form therewith an enclosing housing for a relay and associated circuit components carried on said base, as well as for the layer of photosensitive material coated upon the inner surface of the dome-like shell; a further object being to coat the layer of photosensitive material upon the inner surface of the shell in position to receive the impingement of incident light rays with maximum efficiency.

Another important object is to provide a cell of the character mentioned including a layer of photosensitive material coated upon a support member of ray transparent material, and including an electrode comprising spaced apart fingers in electrical contact with said layer, substantially throughout the entire extent thereof, and a cooperating electrode embodying similarly spaced apart fingers in electrical contact with said layer, between the fingers of the other electrode, whereby the adjacent portions of said electrodes are substantially equally spaced apart throughout the area of the layer; another object being to form the electrodes on the sensitive layer as relatively thin films of electrically conductive material applied in situ by painting the conductive material upon the layer, or by spraying the material upon the layer through a suitable patterned template or stencil, or by evaporating metallic electrode material and causing the same to condense upon the layer in a desired pattern defined as by means of a stencil.

Another important object of the invention is to provide an inexpensive photosensitive cell embodying a crystalline light responsive detector, such as the sulphide or selenide of cadmium or mercury.

Briefly stated, in accordance with one aspect of the invention, a dome-like shell of material, such as glass, pervious to light rays and having an open end may be provided with a layer of light sensitive material, such as the selenide or sulphide of cadmium or mercury, coated upon the inner surface of the shell, said shell being adapted to be sealingly secured to the periphery of a support plate to form therewith a moisture and dirt excluding housing enclosing said layer together with light responsive control apparatus components, such as a relay switch, rectifying means, and associated circuit forming elements, the sensitive layer being provided with spaced electrode means, preferably embodying interspersed fingers in electrical contact with said layer substantially throughout its entire area, whereby to electrically interconnect the layer with the circuit components carried on the support plate within the housing, the support plate being provided with sealed means for interconnecting the housing enclosed components in electrical circuits outwardly of the housing.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

Figure 1:
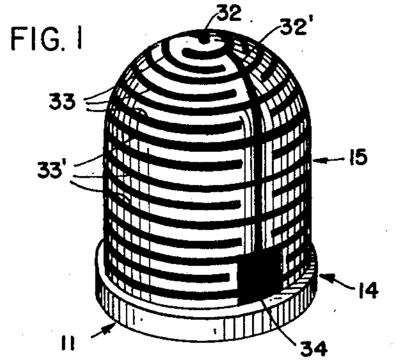
Fig. 1 is a perspective view illustrating a preferred embodiment of the invention.
Figure 2:
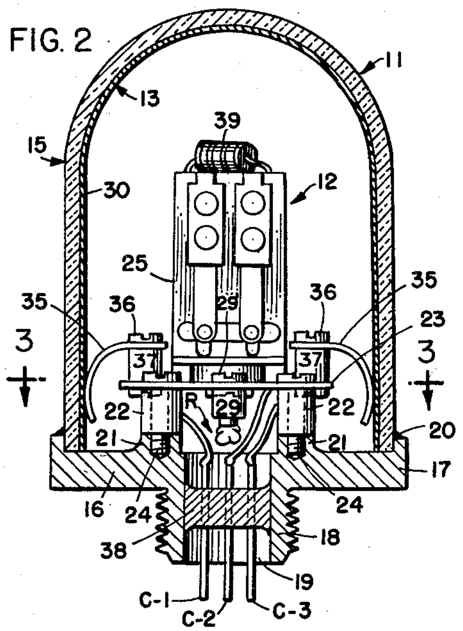
Fig. 2 is an enlarged sectional view through the device shown in Fig. 1.
Figure 3:
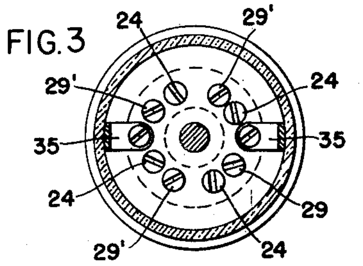
Fig. 3 is a sectional view taken substantially along the line 3—3 in Fig. 2.

To illustrate the invention the drawings show a photosensitive control unit 11 comprising an electrical relay 12 forming an operable device, and a photosensitive cell X embodying the present invention and comprising light detecting means 13 adapted to be controllingly connected with said relay for causing the same to operate in response to changes in the intensity of light incident upon the detecting means. In the illustrated embodiment, the relay and light sensitive detecting means are enclosed within a sealed, moisture and dirt-proof housing 14. To this end, the cell X preferably comprises a layer of photosensitive material forming the detecting means 13, said layer being carried on a support member 15 adapted to form a wall portion of the housing 14, said support member 15 comprising material which is substantially transparent to the rays to which the photosensitive material of the layer is responsive. The transparent housing portion 15 may comprise glass so that visible light rays penetrating said transparent portion 15 may impinge upon the sensitive detecting means 13 and thereby cause the same to control the operation of the relay 12 in response to changes in the intensity of light rays impinging on the detecting means.

The housing 14 may conveniently comprise a plate-like support base 16, as of metal such as steel, the base being preferably formed with an upstanding peripheral flange 17 and a dependent, preferably cylindrical mounting collar 18, which may be externally screw threaded for attachment on any convenient or conventional support standard. The collar 18 is preferably disposed centrally of the support base 16 and formed integrally therewith, said collar defining an opening 19 through said support base. The ray transparent housing portion 15 may conveniently comprise a dome-like shell, which may have generally hemispherical configuration, or, as shown, the shell may comprise a cylinder, closed at one end and open at the other, the open end of the shell being sized to fit snugly within the flanged rim 17 of the support base whereby the shell may be sealingly secured to the base by any suitable sealing material applied to form a peripheral seal 20.

Inwardly of its marginal edge, the support base may be provided with upwardly extending bosses 21 spaced about the opening 19 and adapted to carry insulators 22, on which, in turn, a support plate 23 may be mounted, said plate and the insulators 22 being secured on the bosses 21, as by means of studs 24 penetrating the mounting plate and insulators and having threaded engagement in the bosses.

The relay 12 may comprise a frame 25 forming a magnetic circuit, an actuating coil 26, a shiftable armature 27, and switch contact elements 28 operated by movement of the armature. The relay may be mounted on the support plate 23 in any suitable or preferred fashion, as by means of fastening screws applied to clampingly fasten the frame 25 on the plate 23. The plate 23 may also carry rectifier means R of any suitable or convenient type, said rectifier means preferably comprising a diode element or elements of semi-conducting material, such as germanium, silicon, or other semi-conductive substance capable of electrical current rectification. As shown, the rectifier means R may be mounted on insulating means 29, which, in turn, may be secured on the mounting plate 23, as by means of fastening screws 29'. As shown more particularly in Fig. 4 of the drawings, a plurality of rectifying elements R–1, R–2, R–3, and R–4 may be employed, said elements being preferably mounted in circularly spaced relation on the plate intermediate the plate supporting insulators 22.

The photosensitive detector means 13 may comprise crystalline light sensitive material, such as the sulphide of cadmium or mercury, or the selenide of cadmium, the same being disclosed in U. S. Letters Patent No. 2,706,792 on the invention of John E. Jacobs in X-ray Detection, which issued April 19, 1955, in response to an application for U. S. Letters Patent Serial No. 441,873, filed July 7, 1954 as a division of an original application for U. S. Letters Patent Serial No. 228,333 of May 25, 1951, now abandoned. These crystalline photosensitive materials may be comminuted to dust-like consistency, mixed with varnish or shellac as a carrier binder, applied as a thin layer upon the inner surface of the light transparent housing portion 15 and secured in situ by baking the applied layer, preferably in vacuo, to drive off the volatile components of the binder. Crystalline photosensitive material 13 may thus be applied as a thin layer 30 of substantially uniform thickness upon the inner surface of the transparent envelope portion 15. Alternately, the layer 30 may be applied by first vaporizing selected crystalline material and by then allowing the material to condense from its vapor stage as a thin film upon the surfaces of the cover to be coated, vaporization and condensation being preferably accomplished in vacuo.

A pair of spaced apart electrodes 31 and 31' may be provided in electrical contact with the layer 30, said electrodes preferably comprising silver, graphite, aluminum or other preferably metallic electrical conducting material applied as a printed or painted coating upon the inwardly facing surface of the layer 30. To this end, finely divided conducting material may be mixed with a suitable carrier, such as varnish, shellac, alcohol, or lacquer, and applied by painting, printing or spraying through a mask or template, or by a silk screen printing procedure. Alternately, metal, such as silver or aluminum, may be vaporized and applied, through a suitable mask, upon the surface of the layer, and allowed to condense thereon in the desired electrode pattern, as determined by the mask. As shown, the electrodes 31 and 31' comprise each a pair of stripes 32 and 32' extending radially and longitudinally of the shell, from its apex to the open end thereof, respectively, on diametrically opposite sides of the shell, and circumferentially extending fingers 33 and 33' connected, respectively, with said stripes and extending oppositely therefrom, the fingers 33 being substantially parallel and alternately interspersed with respect to the fingers 33', so that all portions of the stripe 32 and fingers 33, comprising one electrode, are substantially equally spaced with respect to the adjacent portions of the stripe 32' and fingers 33', which form the other electrode. The electrodes are each preferably provided with an enlarged conductive portion 34, said portions being preferably disposed on opposite sides of the shell 15 near the open end thereof in position to make electrical contact with cooperating wiper blades 35, secured, as by means of fastening screws 36, on insulating pedestals 37, carried by the support plate 23, means being provided for electrically connecting the wiper blades 35 and, hence, the photosensitive layer connected electrodes with the circuit components mounted on the plate 23.

It will be apparent, of course, that all of the components of the device, other than the shell 15, the shell mounted layer 30 and the layer engaging electrodes, may be mounted and assembled on the support base 16 prior to the application of the shell 15 in housing forming position upon the base member 16. The assembly unit may also include a plurality of conductors C–1, C–2, and C–3, extending in the channel 19 through suitable channel sealing means 38, which may conveniently comprise a body of plastic material having insulating properties applied in the collar 18, in position sealing the opening 19. The conductors C–1, C–2, and C–3 may be electrically interconnected with the components mounted on the plate 23, thereby providing for the connection of the control device 11 with a suitable source of electrical power S for the operation of the device, as well as with an operable load device L, to be controlled in response to the intensity of light rays incident upon the sensitive detecting means 13, the power source being connectible between the conductors C–1 and C–2, and the controllable load device being connectible between the conductors C–2 and C–3. After the assembly of all of the components in position on the support base 16, it is merely necessary to apply the separately fabricated shell 15 in housing forming position on the support base, with the conductive portions 34 of the layer connected electrodes in electrical contact with the wiper contact blades 35, and to apply the peripheral seal 20 in order thus to complete the fabrication of the unit.

Figure 4:
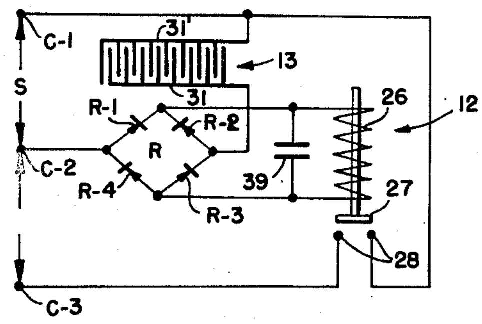
Fig. 4 is a diagram of circuit components and connections which may be applied in a unit of the sort shown in Fig. 2.
Figure 5:
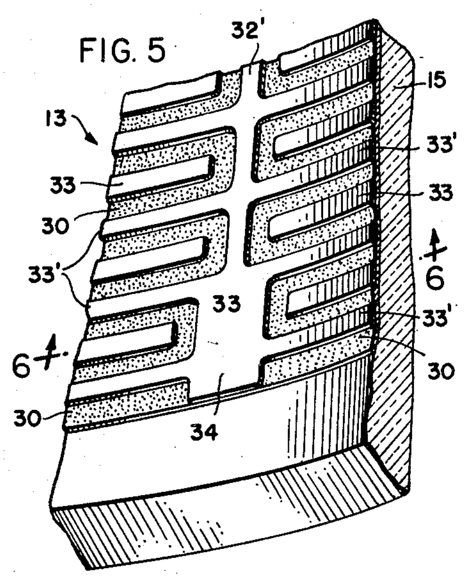
Fig. 5 is a fragmentary perspective view of a portion of a photosensitive cell embodying the present invention.
Figure 6:
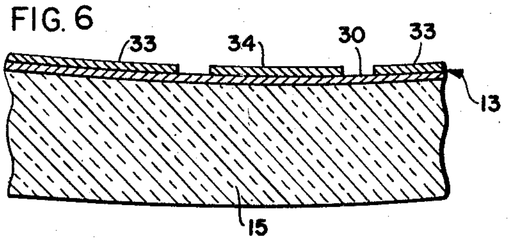
Fig. 6 is an enlarged sectional view taken substantially along the line 6—6 in Fig. 5.

As shown more particularly in Fig. 4 of the drawings, the rectifying elements R–1, R–2, R–3, and R–4 may be interconnected to form a rectifying system connected between the power supply conductors C–1 and C–2 in series with the photosensitive means 13, the operating coil 26 of the relay being connected across the output side of the rectification system in parallel with a condenser 39, said condenser being enclosed with the relay within the housing 14. Accordingly, unidirectional current power may be supplied from the rectifying system R, to energize the relay coil 26, in response to the delivery of alternating current power to the rectifying system under the control of the light sensitive means 13. The switch contact elements 28 of the relay may be interconnected between the conductors C–1 and C–3 so as to control the supply of operating power from the power source S to an operable load device L interconnected between the conductors C–2 and C–3 outwardly of the unit 11.

The photosensitive means 13, in the absence of light, operates substantially as an insulator, thereby preventing current flow therethrough. Accordingly, in the absence of incident light on the layer 30, the rectifying system in Fig. 4 will pass no actuating energy to the relay coil so that the relay will remain de-energized. As the intensity of incident light on the photosensitive means 13 increases from a condition of substantial darkness, the material of the layer becomes progressively more electrically conductive, thereby permitting the delivery of current in increasing amounts to the operating coil of the relay. The relay 12, accordingly, will operate as soon as the intensity of incident light on the photosensitive means 13 reaches a value permitting delivery to the coil 26 of sufficient current to actuate the relay.

The relay switch 28 may comprise either a normally closed or a normally open switch. Where the device embodies a normally closed switch, the load device L will be energized for operation whenever the intensity of light incident upon the photosensitive means 13 is below a relay energizing level, the coil 26 becoming energized to open the switch and thereby discontinue the operation of the load device L whenever the intensity of impinging light on the photosensitive means 13 exceeds the relay actuating level.

Where the relay switch comprises a normally open switch adapted to be closed when the coil 26 is energized, actuating energy will be supplied to the load device L only so long as light at or in excess of the relay actuating intensity level of the device is applied to the photosensitive means 13, the supply of operating energy to the load device L being cut off as and when the intensity of incident light on the sensitive means 13 falls below said relay actuating level. If desired, adjustable means may be provided for retarding the operation to any desired variable extent within the range of such adjustable means, in order to allow the device to be set for operation at a desired intensity of incident light on the photosensitive means 13. Alternately, adjustment may be provided by means of adjustable shutter means for controlling the amount of light that is allowed to fall upon the layer 30. In that connection, the shutter means may be disposed in position surrounding and at least partially or completely enclosing or covering the ray pervious housing portion 15, the shutter means including shutter members adjustably shiftable to uncover the pervious portion 15 or to otherwise allow access of light to the layer 30, to a desired extent. For instance, a ray impervious shell formed with a ray pervious window or windows may be mounted upon the base 16, in position enclosing the dome-like shell 15. A shutter member may be shiftably mounted on the ray impervious shell in position to cover the window or windows or to uncover the same to any desired extent. Any suitable, preferred, or convenient adjustable shutter arrangement may, of course, be employed.

It is thought that the invention and its numerous attendant advantages will be fully understood from the foregoing description, and it is obvious that numerous changes may be made in the form, construction, and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A photosensitive cell comprising a support member of plate-like character, a layer of photosensitive material adhered upon a surface of said member, said member being formed of material substantially transparent to rays to which the material of said layer is sensitive whereby said layer may respond to rays applied thereto through said member, said member forming a hollow shell, with said layer coated upon the inner surface of the shell, and electrode means disposed in electrical contact with a surface of said layer.

2. A photosensitive cell comprising a support member of plate-like character, a layer of photosensitive material adhered upon a surface of said member, said member being formed of material substantially transparent to rays to which the material of said layer is sensitive whereby said layer may respond to rays applied thereto through said member, said member forming a dome-like shell having an open bottom, with said layer coated upon the inner surfaces of the shell, electrode means disposed in electrical contact with a surface of said layer, and cover means enclosing said open bottom.

3. A photosensitive cell comprising a support member of plate-like character, a layer of photosensitive material adhered upon a surface of said member, said member being formed of material substantially transparent to rays to which the material of said layer is sensitive whereby said layer may respond to rays applied thereto through said member, said member forming a hollow shell, with said layer coated upon the inner surface of the shell, and electrode means disposed in electrical contact with the member remote surface of said layer.

4. A photosensitive cell comprising a support member of plate-like character, a layer of photosensitive material adhered upon a surface of said member, said member being formed of material substantially transparent to rays to which the material of said layer is sensitive whereby said layer may respond to rays applied thereto through said member, said member forming a hollow shell, with said layer coated upon the inner surface of the shell, and electrode means comprising spaced apart and electrically interconnected fingers of electrical conducting material disposed in electrical contact with a surface of said layer.

5. A photosensitive cell comprising a support member of plate-like character, a layer of photosensitive material adhered upon a surface of said member, said member being formed of material substantially transparent to rays to which the material of said layer is sensitive whereby said layer may respond to rays applied thereto through said member, said member forming a hollow shell, with said layer coated upon the inner surface of the shell, and electrode means comprising spaced apart and electrically interconnected fingers of electrical conducting material disposed in electrical contact with the member remote surface of said layer.

6. A photosensitive cell comprising a support member of plate-like character, a layer of photosensitive material adhered upon a surface of said member, said member being formed of material substantially transparent to rays to which the material of said layer is sensitive whereby said layer may respond to rays applied thereto through said member, said member forming a hollow shell, with said layer coated upon the inner surface of the shell, and a pair of electrodes disposed in electrical contact with a surface of said layer, each of said electrodes comprising substantially parallel, spaced apart fingers of electrical conducting material disposed in electrical contact with a surface of said layer, the fingers of each electrode being electrically interconnected together and interspersed medially between the spaced fingers of the other electrode.

7. A photosensitive cell comprising a support member of plate-like character, a layer of photosensitive material adhered upon a surface of said member, said member being formed of material substantially transparent to rays to which the material of said layer is sensitive whereby said layer may respond to rays applied thereto through said member, said member forming a hollow shell, with said layer coated upon the inner surface of the shell, and a pair of electrodes each comprising a plurality of circularly curved, substantially parallel and spaced apart fingers of electrical conducting material disposed in electrical contact with a surface of said layer, each electrode including a connection stripe electrically interconnecting said curved fingers, the curved fingers of each electrode being interspersed medially between the spaced apart and curved fingers of the other electrode.

8. A photosensitive cell comprising a support member of plate-like character, a layer of photosensitive material adhered upon a surface of said member, said member being formed of material substantially transparent to rays to which the material of said layer is sensitive whereby said layer may respond to rays applied thereto through said member, said member forming a hollow shell, with said layer coated upon the inner surface of the shell, and electrode means disposed in electrical contact with a surface of said layer, said photosensitive material being selected from the class consisting of the sulphides and selenides of cadmium and mercury.

9. A photosensitive cell comprising a support member of plate-like character, a layer of photosensitive material adhered upon a surface of said member, said member being formed of material substantially transparent to rays to which the material of said layer is sensitive whereby said layer may respond to rays applied thereto through said member, said member forming a hollow shell, with said layer coated upon the inner surface of the shell, and electrode means disposed in electrical contact with a surface of said layer, said photosensitive material being selected from the class consisting of the sulphides and selenides of cadmium and mercury and comprising a film-like layer condensed from the vapor stage of its constituent material.

10. A photosensitive cell comprising a support member of plate-like character, a layer of photosensitive material adhered upon a surface of said member, said member being formed of material substantially transparent to rays to which the material of said layer is sensitive whereby said layer may respond to rays applied thereto through said member, said member forming a hollow shell, with said layer coated upon the inner surface of the shell, and electrode means disposed in electrical contact with a surface of said layer, said photosensitive material being selected from the class consisting of the sulphides and selenides of cadmium and mercury and comprising a layer of comminuted material baked in place on the member in the presence of an evaporable binder, under reduced pressure conditions.

11. A photosensitive cell comprising a support member of plate-like character, a layer of photosensitive material adhered upon a surface of said member, said member being formed of material substantially transparent to rays to which the material of said layer is sensitive whereby said layer may respond to rays applied thereto through said member, said member forming a hollow shell, with said layer coated upon the inner surface of the shell, and electrode means disposed in electrical contact with a surface of said layer, said electrode means comprising electrical conducting paint coated upon the layer.

12. A photosensitive cell comprising a support member of plate-like character, a layer of photosensitive material adhered upon a surface of said member, said member being formed of material substantially transparent to rays to which the material of said layer is sensitive whereby said layer may respond to rays applied thereto through said member, said member forming a hollow shell, with said layer coated upon the inner surface of the shell, and electrode means disposed in electrical contact with a surface of said layer, said electrode means comprising electrical conducting material condensed from its vapor stage to form a coating upon the layer.

References Cited in the file of this patent

UNITED STATES PATENTS

| | | |
|---|---|---|
| 2,074,226 | Kunz et al. | Mar. 16, 1937 |
| 2,448,518 | Cashman | Sept. 7, 1948 |
| 2,544,261 | Gibson | Mar. 6, 1951 |
| 2,553,420 | McFee | May 15, 1951 |
| 2,651,700 | Gans | Sept. 8, 1953 |